July 8, 1924.

J. P. HOOPER

THREAD FORMING APPARATUS

Filed Feb. 23, 1922

1,500,933

Inventor

James P. Hooper

By Marm & Co

Attorneys

Patented July 8, 1924.

1,500,933

UNITED STATES PATENT OFFICE.

JAMES P. HOOPER, OF RUXTON, MARYLAND, ASSIGNOR TO JAMES P. HOOPER MANUFACTURING COMPANY, OF BALTIMORE, MARYLAND, A CORPORATION OF MARYLAND.

THREAD-FORMING APPARATUS.

Application filed February 23, 1922. Serial No. 538,735.

*To all whom it may concern:*

Be it known that JAMES P. HOOPER, a citizen of the United States, residing at Ruxton, in the county of Baltimore and State of Maryland, has invented certain new and useful Improvements in Thread-Forming Apparatus, of which the following is a specification.

This invention relates to an improved apparatus for producing artificial silk threads from viscose or equivalent substances.

The object of the invention is to provide an improved structure for producing threads by centrifugally-throwing a thread-forming solution.

One form of structure embodying the invention is illustrated in the accompanying drawing, wherein,—

Figures 1, 2:
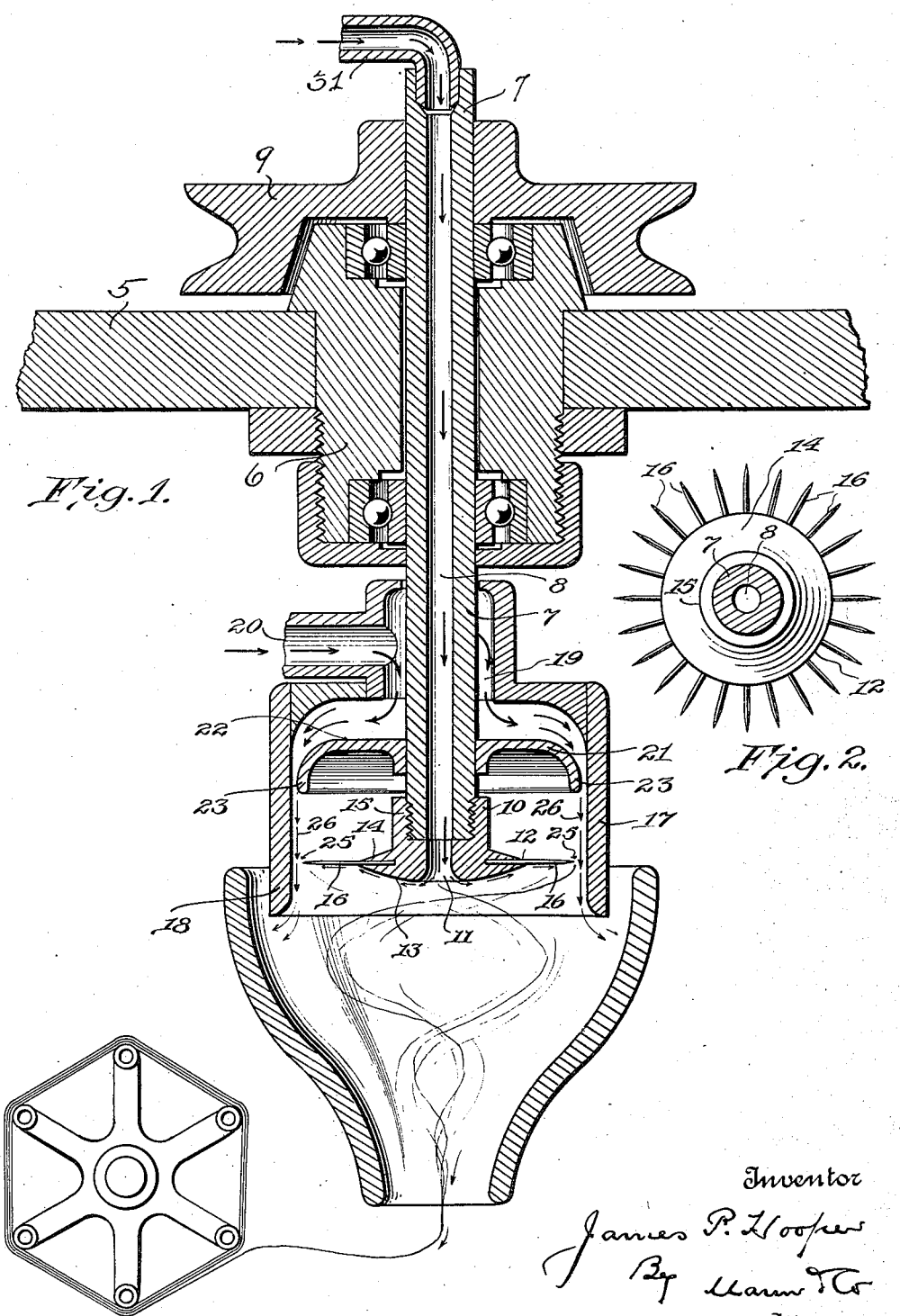
Fig. 1 shows the structure in vertical section.
Fig. 2 illustrates the detached spinneret in top or plan view.

Referring to the drawing the numeral 5 designates a supporting structure in which a bearing 6 is sustained and a vertical spindle 7 extends through said bearing. The spindle is tubular in form and has a central passage 8 and a pulley or equivalent device 9 is attached to the spindle whereby to rotate the same.

To the lower end of the spindle I attach a head 10 which latter, in this instance, has a central passage 11 extending upwardly from the lower side of the head which passage communicates or is in register with the passage 8 of the spindle.

The head 10, in the present instance, is circular in form with its point of greatest diameter 12, located in a plane crossing the axis at a point between the two ends of the head-passage 11. In other words, if the spindle 7 is vertically located and the head 10 is mounted thereon so as to revolve in a horizontal plane, the point of greatest diameter 12 of the head is located slightly above the lowermost discharge-end of the central passage 11.

It has been found in practice that the head 10 may be revolved in either a horizontal or a vertical plane and also that instead of the head being on the lower end of the spindle the entire structure may be reversed so the head will be carried at the upper end of the spindle.

Because of these several positions in which the head may be operated with good results, without a change of form or the relation of the parts, except to reverse them or place them on their sides, I have found it necessary to adopt expressions which will distinguish one side of the head from the other, because the expression lower and upper sides will not suffice.

With this in view, I shall therefore call the side or surface 13, of the head the outer side while the opposite side or surface 14 will be termed the inner side of said head.

The point 12 therefore of greatest diameter of the head is located in a plane between the outer and inner sides or surfaces of the head, and the outer side or surface 13, of the head is convex in that it curves backwardly from the outlet end of the central passage 11 to the point of greatest diameter, for a purpose that will presently be explained.

The precise shape of the inner side 14 of the head is not essential, but in the present instance it slopes.

The head 10 is attached to the spindle in any suitable manner but in the present instance is shown as having an internally-threaded socket 15, which receives the threaded end of the spindle.

At the point of greatest diameter 12, I provide the head with a series of radially-projecting needles 16 which are rigidly attached to and revolve or travel in a circular path as the spindle and head revolve together.

Around the spindle, the head and the radially-projecting needles I provide a shell 17 which has a circular wall 18. This wall extends past the head from the inner to the outer side of the latter and terminates at a point beyond the said outer side of the head. The inner circumference of this circular wall 18 is spaced from the outer ends of the needles, for a purpose which will also be presently explained.

A distributor-chamber 19 is provided at or adjacent to the inner end of the shell 17 and a supply-pipe 20 enters said distributor-chamber for the purpose of continuously supplying a setting solution to that chamber. The supply of setting solution may be forced or not as desired.

Between the head 10 and the distributor-chamber 19 I provide a baffle 21. This baffle is therefore located at the inner side of the head.

In the present instance this baffle has the form of a disk whose inner side 22, confronts the distributor-chamber and whose rim 23 is curved outwardly toward the inner circumference of the shell-wall 18 but is spaced from the latter.

In the present instance the baffle is shown as carried on the spindle 7 so as to revolve therewith but this is not essential.

A tube 24 supplies a viscose or equivalent solution to the passage 8 of the spindle.

The operation of the structure is substantially as follows:

Viscose, or equivalent solution, is supplied to the passage 8 of the spindle and passed through the latter to the passage 11 of the rapidly-revolving head 10. The centrifugal force set up by this rotation and the character of the viscose solution is such that as it leaves the end of the head-passage it will follow the contour or curved outer side or surface 13 of the head and flow to the annular edge or point of greatest diameter 12 of the head. At this point the rotary motion of the head causes the viscose solution to drag along the edge of the head between the needles until it reaches the front side of the needles and the centrifugal action then causes the solution to flow outwardly along the needles 16 which in practice are of a very small gage and be ejected in the form of strands or threads.

The rapid rotation of these needles causes the strands or threads to be ejected or thrown from the ends thereof.

As the needles are of such length as to leave a gap or space 25 around their outer ends the threads will extend across that air-gap toward the inner wall of the shell.

While the threads are thus being ejected I provide a wall of setting solution about the inner circumference of the shell-wall 18. The solution passes from the chamber 19 into the inner end of the shell 17 and impinges against the inner side 22 of the rotating baffle which imparts a whirling action to the solution and causes it to flow along the shell-wall in a comparatively thin annular stream. The baffle also prevents the setting solution from direct contact with the needles or the inner side 14 of the head where its deposit would cause a setting of the thread-forming solution.

The wall of setting solution is indicated by the broken lines 26 at the inner side of the shell and by reference to Fig. 1. It will be noted that a gap 25 is left between the ends of the needles and the wall of setting solution.

This gap is provided so as to prevent the setting solution from contacting with the thread-forming solution while the latter is in the needle-ends which causes the ejected strands to leave the needles in short lengths whereas if the gap is maintained long threads will be formed.

As the threads extend across the gap 25, and enter the setting solution their speed of rotation is slowed down and an elongation and stretch of the thread follows as well as a twisting together of the numerous threads as they are led off from the shell.

Having described my invention, I claim,—

1. A mechanism for forming threads including a rotating head, a series of needles moving with the head and means for flowing a thread-forming solution over an exterior surface of the head to feed the same to the needles.

2. A mechanism for forming threads including a head having a series of needles projecting therefrom, means for conveying a thread-forming solution over the exterior of the head to feed the same to the needles and means for rotating the head to centrifugally throw the solution from the needles in the form of threads.

3. A mechanism for forming threads including a rotary head having a solid body-part with a series of needles about and radiating from said solid body-part and means for supplying a thread-forming solution to the needles to be thrown therefrom in the form of threads.

4. A mechanism for forming threads including a rotary head having a solid body-part with a series of needles about and radiating from said solid body-part and means for flowing a thread-forming solution over an exterior surface of the head to feed the same to the needles.

5. A mechanism for forming threads including a head, a series of needles radiating from a solid chamberless portion of said head, means for feeding a thread-forming solution over an exterior surface of the head to feed the same to the needles and means for rotating the head to centrifugally throw the solution from the ends of the needles.

6. A mechanism for forming threads including a chamberless head with a passage to feed a thread-forming solution to the exterior of the head, a series of needles radiating from the said head and out of communication with the said passage,—said needles collecting the solution from the exterior of the head and means for revolving the head to move the needles in a circular path and thereby centrifugally eject the solution in the form of threads.

7. A mechanism for forming threads including a head having an enlargement around its exterior, a series of needles radiating from said enlargement and means for flowing a thread-forming solution over an exterior surface of the head to said enlargement to feed the same to the needles and means for revolving the head and needles to eject the solution from the latter in the form of threads.

8. A mechanism for forming threads including a head having a passage therethrough and having a circumference that is only accessible from the said passage by traversing an exterior surface of the head, a series of needles about the circumference of the head, means for supplying a thread-forming solution to said passage and means for revolving the head to cause said solution to flow along the exterior surface of the head to said needles.

9. A mechanism for forming threads including a spindle having a passage therein, a head attached to said spindle and having a passage extending therethrough from the spindle passage to an exterior surface of the head, a series of needles carried by the head no portion of said needles being exposed to either of said passages, means for feeding a thread-forming solution to said passages, and means for revolving the spindle and head to cause the solution to traverse the exterior surface of the head to the needles.

10. The combination with a hollow spindle, of a head having an exterior circular enlargement said head also having a central passage and opening in a plane beyond said enlargement, a series of needles about said enlargement and means for revolving the head and needles.

11. A head for a thread-forming mechanism comprising a body having a central passage, a convex surface at the discharge-side of said passage and a series of needles about the head at the edge of the convex surface.

12. A head for a thread-forming mechanism comprising a body having a central passage and an exterior enlargement extending about and out of communication with the passage said head having an exterior surface that extends from the outlet end of the passage to the periphery of the said enlargement and a series of needles around the enlargement and radiating from said head.

In testimony whereof I affix my signature.

JAMES P. HOOPER.